(12) United States Patent
Oezyilmaz et al.

(10) Patent No.: US 11,858,812 B2
(45) Date of Patent: Jan. 2, 2024

(54) MONOLITHIC AND FRACTAL CARBON FOAMS AND METHODS OF PREPARING AND USING SAME

(71) Applicant: National University of Singapore, Singapore (SG)

(72) Inventors: Barbaros Oezyilmaz, Singapore (SG); Jonghak Lee, Singapore (SG); Clarissa Chui Ling Wong, Singapore (SG); Cagdas Cetin, Singapore (SG); Xiao Feng Lim, Singapore (SG); Yong Kang Ong, Singapore (SG)

(73) Assignee: National University of Singapore, Singapore (SG)

( * ) Notice: Subject to any disclaimer, the term of this patent is extended or adjusted under 35 U.S.C. 154(b) by 112 days.

(21) Appl. No.: 17/535,246

(22) Filed: Nov. 24, 2021

(65) Prior Publication Data
US 2022/0081299 A1    Mar. 17, 2022

Related U.S. Application Data

(63) Continuation-in-part of application No. 17/613,421, filed as application No. PCT/SG2020/050273 on May 13, 2020.

(60) Provisional application No. 62/851,793, filed on May 23, 2019.

(51) Int. Cl.
*C01B 32/18*    (2017.01)

(52) U.S. Cl.
CPC .......... *C01B 32/18* (2017.08); *C01P 2004/64* (2013.01); *C01P 2006/10* (2013.01); *C01P 2006/14* (2013.01); *C01P 2006/40* (2013.01)

(58) Field of Classification Search
CPC ..... C01B 32/05; C01B 32/18; C01P 2004/64; C01P 2006/10; C01P 2006/14; C01P 2006/20
See application file for complete search history.

(56) References Cited

U.S. PATENT DOCUMENTS

| | | |
|---|---|---|
| 10,984,830 B2 | 4/2021 | Ozyilmaz et al. |
| 11,114,674 B2 | 9/2021 | Ozyilmaz et al. |
| 11,192,788 B2 | 12/2021 | Ozyilmaz et al. |

(Continued)

FOREIGN PATENT DOCUMENTS

| | | |
|---|---|---|
| CN | 108530098 A | 9/2018 |
| CN | 110357074 A | 10/2019 |
| WO | WO-2018156082 A1 | 8/2018 |

OTHER PUBLICATIONS

Wang, Ye, et al. "Pre-lithiation of onion-like carbon/MoS 2 nano-urchin anodes for high-performance rechargeable lithium ion batteries." Nanoscale 6.15 (2014): 8884-8890.*

(Continued)

*Primary Examiner* — Richard M Rump
(74) *Attorney, Agent, or Firm* — Cesari and McKenna, LLP; James A. Blanchette

(57) ABSTRACT

A monolithic carbon foam formed of fused onion-like carbon (OLC) nanoparticles, in which the monolithic carbon foam contains interconnected pores, has a volumetric micropore surface area of 200 $m^2$/cc-600 $m^2$/cc, and has an electrical conductivity of 20 s/cm-140 s/cm. Also disclosed are electrodes and energy storage devices constructed therefrom.

20 Claims, 11 Drawing Sheets

(56) References Cited

U.S. PATENT DOCUMENTS

2017/0297923 A1 10/2017 Ghosh et al.
2021/0017026 A1 1/2021 Ozyilmaz et al.

OTHER PUBLICATIONS

Mao, By Shun, et al. "Hierarchical nanohybrids with porous CNT-networks decorated crumpled graphene balls for supercapacitors." ACS applied materials & interfaces 6.12 (2014): 9881-9889.*

Ukhina et al "Porous Electrically Conductive Materials Produced by Spark Plasma Sintering and Hot Pressing of Nanodiamonds" Ceramics International vol. 41, pp. 12459-12463, 2015.

I. B. Mason, et al. "The Young Modulus of Carbon and Graphite Artefacts." Carbon. 1967. vol. 5. pp. 493-506.

R. G. Brown, et al. "The Hardness of Irradiated Graphite." Carbon. 1968. vol. 6. pp. 27-30.

A. L. Mackay, et al. "Diamond from graphite." Nature. Aug. 29, 1991. vol. 352. p. 762.

Gareth B. Neighbour. "Modelling of dimensional changes in irradiated nuclear graphites." Journal of Physics D: Applied Physics. 2000. vol. 33. pp. 2966-2972.

Ryong Ryoo, et al. "Ordered Mesoporous Carbons." Advanced Materials. May 3, 2001. vol. 13, No. 9. pp. 677-681.

E. Barborini, et al. "Negatively curved spongy carbon." Applied Physics Letters. Oct. 22, 2002. vol. 81, No. 18. pp. 3359-3361.

F. Valencia, et al. "Theoretical characterization of several models of nanoporous carbon." New Journal of Physics. Sep. 30, 2003. vol. 5. pp. 123.1-123.16.

J. Shen, et al. "Spark plasma sintering assisted diamond formation from carbon nanotubes at very low pressure." Nanotechnology. Mar. 31, 2006. vol. 17. pp. 2187-2191.

L. N. Bourgeois, et al. "High-resolution transmission electron microscopic study of nanoporous carbon consisting of curved single graphitic sheets." Philosophical Magazine A. Sep. 13, 2006. vol. 76, No. 4. pp. 753-768.

Shuichi Ishimoto, et al. "Degradation Responses of Activated-Carbon-Based EDLCs for Higher Voltage Operation and Their Factors." Journal of the Electrochemical Society. May 8, 2009. vol. 156, No. 7. pp. A563-A571.

R. Kotz, et al. "Aging and failure mode of electrochemical double layer capacitors during accelerated constant load tests." Journal of Power Sources. Aug. 25, 2009. vol. 195. pp. 923-928.

Robert P. Ewing, et al. "Scale dependence of intragranular porosity, tortuosity, and diffusivity." Water Resources Research. Jun. 17, 2010. vol. 46. pp. 1-12.

Zongping Chen, et al. "Three-dimensional flexible and conductive interconnected graphene networks grown by chemical vapour deposition." Nature Materials. Apr. 10, 2011. vol. 10. pp. 424-428.

Faming Zhang, et al. "Thermal stability of carbon nanotubes, fullerene and graphite under spark plasma sintering." Chemical Physics Letters. May 11, 2011. vol. 510. pp. 109-114.

Yanwu Zhu, et al. "Carbon-Based Supercapacitors Produced by Activation of Graphene." Science. Jun. 24, 2011. vol. 332. pp. 1537-1541.

Ofer Tevet, et al. "Friction mechanism of individual multilayered nanoparticles." PNAS. Dec. 13, 2011. vol. 108, No. 50. pp. 19901-19906.

D. Weingarth, et al. "Cycle versus voltage hold—Which is the better stability test for electrochemical double layer capacitors?" Journal of Power Sources. Oct. 17, 2012. vol. 225. pp. 84-88.

Rodney S. Ruoff. "Personal perspectives on graphene: New graphene-related materials on the horizon." MRS Bulletin. Dec. 2012. vol. 337. pp. 1314-1318.

Xiaowei Yang, et al. "Liquid-Mediated Dense Integration of Graphene Materials for Compact Capacitive Energy Storage." Science. Aug. 2, 2013. vol. 341. pp. 534-537.

Olivier Guillon, et al. "Field-Assisted Sintering Technology/Spark Plasma Sintering: Mechanisms, Materials, and Technology Developments." Advanced Engineering Materials. 2014. vol. 16, No. 7. pp. 830-849.

Florence J. Nelson, et al. "Electronic Excitations in Graphene in the 1-50 eV Range: The $\pi$ and $\pi+\sigma$ Peaks Are Not Plasmons." Nano Letters. Jun. 2, 2014. vol. 14. pp. 3827-3831.

Yuxi Xu, et al. "Holey graphene frameworks for highly efficient capacitive energy storage." Nature Communications. Aug. 8, 2014. pp. 1-8.

Chengzhi Luo, et al. "Diamond synthesis from carbon nanofibers at low temperature and low pressure." Scientific Reports. Sep. 9, 2015. pp. 1-6.

Randall M. German. "Sintering Trajectories: Description on How Density, Surface Area, and Grain Size Change." JOM. Jan. 7, 2016. vol. 68, No. 3. pp. 878-884.

Hanan Abdali, et al. "Preparation of Electrospun Nanocomposite Nanofibers of Polyaniline/Poly(methyl methacrylate) with Amino-Functionalized Graphene." Polymers. Sep. 16, 2017. vol. 9, No. 453. pp. 1-12.

Efrem Braun, et al. "Generating carbon schwarzites via zeolite-templating." PNAS. Aug. 14, 2018. vol. 115, No. 35. pp. E8116-E8124.

M. Khelifa, et al. "Nanoindentation of flexible graphite: Experimental versus simulation studies." Advanced Materials Science. Aug. 16, 2018. vol. 3, No. 2. pp. 1-11.

Keita Nomura, et al. "4.4 V supercapacitors based on super-stable mesoporous carbon sheet made of edge-free graphene walls." Energy & Environmental Science. 2019. vol. 12. pp. 1542-1549.

Je Kang, et al. "Graphene Papers with Tailored Pore Structures Fabricated from Crumpled Graphene Spheres." Nanomaterials. May 28, 2019. vol. 9, 815. pp. 1-11.

Arina V. Ukhina, et al. "Porous electrically conductive materials produced by Spark Plasma Sintering and hot pressing of nanodiamonds" *Ceramics International.* Jun. 2015. vol. 41. pp. 12459-12463.

* cited by examiner

MONOLITHIC AND FRACTAL CARBON FOAMS AND METHODS OF PREPARING AND USING SAME

CROSS-REFERENCE TO RELATED APPLICATIONS

This application is a continuation-in-part of U.S. application Ser. No. 17/613,421 filed Nov. 22, 2021, which is a national stage application of International Application Number PCT/SG2020/050273 filed May 13, 2020, claiming the benefit of priority based on U.S. Provisional Application No. 62/851,793, filed May 23, 2019. Furthermore, the entire contents and disclosures of all applications are incorporated herein by reference in their entirety.

FIELD OF THE INVENTION

The present invention relates generally to highly porous carbon foams and the preparation thereof.

BACKGROUND OF THE INVENTION

Energy storage, such as in supercapacitors, is important for improving energy efficiency. Previous studies have shown that nano-carbon foams are suitable materials for constructing electrodes in supercapacitors. However, existing methods of preparing nano-carbon foams are not scalable for industrial production.

For example, chemical solution-based methods require a significant number of pre- and post-processing steps. As a result, these methods are not only both time-consuming and costly, they also generate chemical waste. Moreover, these methods produce nano-carbon foams containing impurities due to use of chemical reagents and surfactants.

As another example, US Patent Application Publication No. US 2017/0297923 A1 reports a hot-pressing method for preparing a nano-carbon foam from hollow onion-like carbon nanoparticles. This hot-pressing method eliminates the need for chemical reagents and surfactants. Yet, the nano-carbon foam produced thereby has low mechanical stability and inconsistent foam density.

Thus, there is a need for novel methods suitable for industrial scale production of nano-carbon foams having improved structural and mechanical properties.

SUMMARY

In one aspect, the present invention relates to a monolithic carbon foam ("MCF") that is formed of a plurality of onion-like carbon ("OLC") nanoparticles fused together. The MCF, containing interconnected pores, has a volumetric micropore surface area in the range of 10 $m^2/cc$ to 1000 $m^2/cc$ (e.g., 200 $m^2/cc$-600 $m^2/cc$ and 200 $m^2/cc$-500 $m^2/cc$) and an electrical conductivity of 5 s/cm-500 s/cm (e.g., 20 s/cm-140 s/cm and 40 s/cm-75 s/cm). In one embodiment, the foam has a Young's modulus of 0.6 GPa to 5 GPa (e.g., 0.6 GPa to 2 GPa, 1 GPa to 4 GPa, and 1 GPa to 3 GPa). In another embodiment, the foam further contains a material that is a non-OLC-based material (preferably including activated carbon), a semiconductor material, an oxide material, or a metal; specific examples of the material include silicon, molybdenum oxide, and molybdenum disulfide. The material can be in the form of a fiber, a tube, a hollow sphere, a wire, a sheet, or a powder. Also covered by the present invention is a foam powder prepared by crushing the above-described MCF.

The MCF of this invention can be prepared by the steps of: (i) compacting OLC nanoparticles, (ii) placing the compacted OLC nanoparticles in a vacuum or in a space filled with an inert gas (e.g., N2 and Ar), and (iii) spark plasma sintering the OLC nanoparticles at a pressure of 30 MPa-1000 MPa (preferably, 40 MPa-300 MPa) and a temperature of 300° C.-800° C. (preferably, 400° C.-600° C.) for a duration of 2 seconds-30 minutes. In one embodiment, the OLC nanoparticles is compacted with a material in the form of a fiber, a tube, a hollow sphere, a wire, a sheet, or a powder, the material being a non-OLC-based material, an oxide material, a metal, and a semiconductor material. In addition to this method, a monolithic carbon foam prepared thereby is within the scope of the instant invention as well.

In another aspect, the present invention relates to a fractal carbon foam. The fractal carbon foam is prepared by the steps of: (i) crushing the monolithic carbon foam described above to form a monolithic carbon foam powder, (ii) compacting the monolithic carbon foam powder, (iii) placing the compacted monolithic carbon foam powder in a vacuum, and (iv) spark plasma sintering the monolithic carbon foam powder at a pressure of 30 MPa-1000 MPa (preferably, 40 MPa-200 MPa) and a temperature of 300° C.-800° C. (preferably, 600° C.-800° C.) for 2 seconds-30 minutes (preferably, 2 seconds-10 minutes) to form the fractal carbon foam. This method is also within the scope of this invention.

Also disclosed herein are an electrode for use in a supercapacitor containing an active material made of the above-described monolithic or fractal carbon foam and a supercapacitor including such an electrode. More specifically, a supercapacitor of this invention including (i) a negative electrode and a positive electrode both formed of the monolithic or fractal carbon foam depicted above, (ii) a separator disposed between the negative and positive electrodes to prevent a short circuit by direct contact thereof, and (iii) an electrolyte ionically connecting the electrodes, in which the inner surface of each electrode contacts with the electrolyte and the outer surface of each electrode is covered by a current collector.

The details of the invention are set forth in the drawings, the definitions, and the detailed description below. Other features, objects, and advantages of the invention will be apparent from the following actual examples and claims.

BRIEF DESCRIPTION OF THE DRAWINGS

The description below refers to the accompanying drawings, of which.

DETAILED DESCRIPTION OF THE INVENTION

Figure 1A:
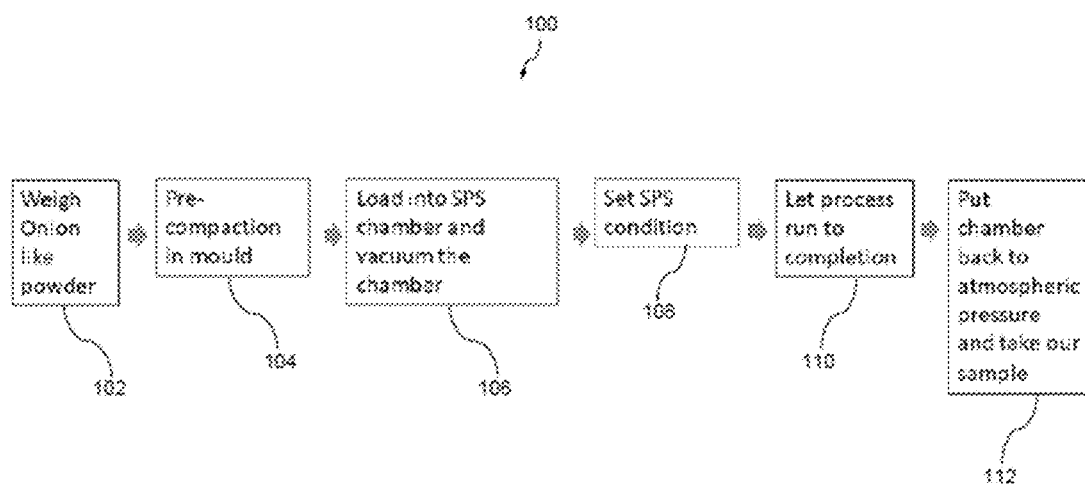
FIG. 1A is a schematic representation of spark plasma sintering ("SPS") of OLC particles.

Described in detail below are the monolithic carbon foam, the fractal carbon foam, the methods of preparing them, and the supercapacitors constructed from them as set forth in the SUMMARY section above.

For purposes of the present disclosure, the term "onion-like carbon nanoparticles" or "OLC nanoparticles" refers to quasi-spherical nanoparticles consisting of fullerene-like carbon layers enclosed by concentric graphitic shells. They exhibit unique zero-dimensional spherical or concentric shell structures with small (e.g., <200 nm, <50 nm, and 1 nm to 100 nm) diameters. They are also commonly referred to as nano-onions. These nanoparticles have properties different from other carbon nanostructures such as graphite, nanodiamonds, and nanotubes.

Furthermore, the term "spark plasma sintering" or "SPS" refers to a pressure-assisted pulsed-current or direct current process in which powder samples are loaded in an electrically conducting die and sintered under a uniaxial pressure. Spark plasma sintering is a technique that uses pressure-driven powder consolidation in which a pulsed direct electric current passes through a sample compressed in a mold. It is also known as field-assisted sintering or pulse electric current sintering. The term "hot-press" refers to a process that supplies thermal energy from an external heating source to a sample with applied pressure. SPS as used in this invention reduces processing time (e.g., 2 seconds to 30 minutes) as compared to conventional hot-press processes (e.g., at least an hour).

The term "monolithic carbon foam" ("MCF") refers to a material prepared by SPS using onion-like carbon nanoparticles, the term "monolithic carbon foam powder" refers to the powder formed by crushing monolithic carbon foam by any known means, and the term "fractal carbon foam" refers to a carbon foam formed from monolithic carbon foam powder.

The term "volumetric micropore surface area" is the resultant difference of BET area and external surface area, obtained by multiplying the specific micropore surface area ($m^2$/g) by the material density (g/cc). Its measurement is described in detail in Galarneau et al., Langmuir 34 (47), 14134-42 (2018).

To reiterate, a monolithic carbon foam of this invention (i) is formed of a plurality of OLC nanoparticles fused together and having interconnected pores, (ii) has a volumetric micropore surface area of 200 $m^2$/cc-600 $m^2$/cc, and (iii) has an electrical conductivity of 20 s/cm-140 s/cm. The foam can be prepared by first compacting OLC nanoparticles and then subjecting the compacted OLC nanoparticles in a vacuum or inert gas environment or in a space filled with an inert gas to a SPS process at a pressure of 30 MPa-1000 MPa and a temperature of 300° C.-800° C. for 2 seconds-30 minutes.

In one embodiment, the monolithic carbon foam thus prepared contains micropores, mesopores, and, optionally, macropores, which, respectively, have diameters of 0.723 nm-2 nm, 2 nm-50 nm, and >50 nm.

In another embodiment, the monolithic carbon foam has a volumetric micropore surface area higher (e.g., 500%-1435%) than that of the OLC nanoparticles and its material density increases (e.g., 0.1 g/cc to 1.2 g/cc, 0.4 g/cc to 1.2 g/cc, 0.1 g/cc to 1 g/cc, 0.5 g/cc to 1 g/cc, and 0.55 g/c to 1 g/cc) with respect to the OLC nanoparticles, whereas its gravimetric total surface area decreases minimally (e.g., from 1200 $m^2$/g to 857 $m^2$/g) also with respect to the OLC nanoparticles. The void fraction of the monolithic carbon foam can range from 30% to 80%, preferably 40% to 70%, and more preferably 45% to 60%. The term "void fraction" refers to the percentage of the volume of voids over the total volume.

OLC nanoparticles are used as a starting material. Preferred OLC nanoparticles are amorphous onion-like carbon ("a-OLC") nanoparticles having a void fraction of 50% or greater (e.g., 50% to 90% and 60% to 80%) and an average diameter of 2 nm to 50 nm (e.g., 5 nm to 40 nm, 20 nm to 40 nm, and 34 nm). The a-OLC nanoparticles each have a hollow sphere structure containing turbostratic graphene layers that are loosely bonded with each other in a disordered manner. Turbostratic graphene layers contain multiple graphene layers (e.g., 2 layers to 100 layers) which are electronically decoupled to allow interlayer rotation and exfoliation.

Commercially available a-OLC nanoparticles include those sold under the trade names of Ketjenblack® EC300J (Lion Specialty Chemicals Co., Tokyo, Japan) and Super Conductive Carbon Black Ketjenblack® EC-600JD (Shanghai Tengmin Industry Co., Shanghai, China). Ketjenblack®

EC300J has a dibutyl phthalate absorption number ("DBP") absorption of 360 cm$^3$/100 g, a BET surface area of 800 m$^2$/g, an average diameter of 80 nm, a void fraction of 60%, and a volume resistivity of 3.9 Ω·cm. On the other hand, Ketjenblack® EC-600JD has a DBP absorption of 495 cm$^3$/100 g, a BET surface area of 1270 m$^2$/g, an average diameter of 78 nm, a void fraction of 80%, and a volume resistivity of 1×10$^8$ Ω·cm.

When subjected to the spark plasma sintering (SPS) of this invention, a-OLC nanoparticles are readily deformed into monolithic carbon foam having OLC nanoparticles fused together and interconnected pores. Not to be bound by theory, SPS exerts a gradient pressure and current-induced Joule heating on a-OLC nanoparticles, which are transformed into fused OLC nanoparticles. The monolithic carbon foam thus prepared has a diamond-like core, a crumpled graphene layer, a conductive graphite layer, or any combination thereof. Preferably, it has a diamond-like core and one or two outer layers: e.g., a crumpled graphene layer and a conductive graphite layer. In one example, the monolithic carbon foam has a crumpled graphene layer covering a diamond-like core. In another example, it has a conductive graphite layer covering a diamond-like core. In a preferred structure, the monolithic carbon foam has a diamond-like core, a crumpled graphene outer layer, and a conductive graphite middle layer, the conductive graphite middle layer is in contact with the crumpled graphene outer layer and the diamond-like core. Under the SPS gradient pressure and Joule heating, a-OLC nanoparticles are compacted and undergo rolling, sliding, and partial exfoliation to form monolithic carbon foam having a superior conductivity and a great hardness.

On the surface of fused a-OLC nanoparticles, a graphene layer is partially exfoliated and crumpled via friction with neighboring nanoparticles to form the crumpled graphene outer layer containing a single layer of sp$^2$ carbon atoms arranged in a two-dimensional nanostructure. At the same time, interconnected pores are generated, thus increasing volumetric surface area.

The SPS gradient pressure increases greatly in inner parts of the fused a-OLC nanoparticles. The pressure is strong enough to compress the middle graphene layers to form a conductive graphite middle layer, which contributes to the superior electrical conductivity of the monolithic carbon foam. Both the graphene layer and the graphite layer contain sp$^2$ carbon atoms connecting to each other covalently within a graphene plane.

The SPS gradient pressure is the greatest in the core of the fused a-OLC nanoparticles. In combination with current induced Joule heating, it compresses the core into a diamond-like core having a sp$^3$ rich backbone (e.g., containing sp$^3$ carbon atoms at a level of at least 5%, at least 10%, 5-95%, or 10-90%). Indeed, SPS has been used to synthesize diamond from carbon nanomaterials. See Luo et al., Sci Rep 5, 13879 (2015); Shen et al., Nanotechnology 17, 2187-91 (2006); and Zhang et al., Chemical Physics Letter 510, 109-114 (2011). The relative abundance of sp$^2$ and sp$^a$ carbon atoms can be determined by known methods such as X-ray photoelectron spectroscopy. See, e.g., Speranza et al., Diamond and Related Materials 13, 445-450 (2004).

The diamond-like core gives rise to an exceptional Vickers hardness Hv of the monolithic carbon foam as high as 950 MPa (e.g., 18 MPa to 935 MPa, 50 MPa to 800 MPa, and 100 MPa to 400 MPa).

The monolithic carbon foam can be a hybrid monolithic carbon foam, namely, a doped monolithic carbon foam that includes a carbon-based material (e.g., activated carbon), an oxide material (e.g., molybdenum oxide), a metal, and a semiconductor material (e.g., silicon and molybdenum disulfide). The material can be in the form of fibers, tubes, hollow spheres, 2D materials, or powders. In a preferred embodiment, the material is 2D molybdenum disulfide (MoS$_2$). In another preferred embodiment, the material is silicon nanoparticles.

Other materials can be used in the SPS process in place of OLC nanoparticles. Examples include carbon nanotubes (single walled or multiwalled), carbon nanofibers, activated carbons, graphene oxide, reduced graphene oxide, graphite flake, amorphous carbon.

Further covered by this invention is a fractal carbon foam prepared from the above-described monolithic carbon foam by crushing the monolithic carbon foam to form a monolithic carbon foam powder; compacting the monolithic carbon foam powder, placing the compacted monolithic carbon foam powder in a vacuum or inert gas environment or in a space filled with an inert gas, and subjecting the monolithic carbon foam powder to a SPS process at a pressure of 30 MPa-1000 MPa and a temperature of 300° C.-800° C. for 2 seconds-30 minutes.

Typically, the fractal carbon foam of this invention has a hierarchical pore structure, i.e., including interconnected micropores, mesopores, and macropores. The micropores, the mesopores, and the macropores, respectively, have diameters of 0.723 nm-2 nm, 2 nm-50 nm, and >50 nm.

A hybrid fractal carbon foam, another contemplated invention, can be formed from the hybrid monolithic carbon foam described above.

Preferably, the monolithic carbon foam, the hybrid monolithic carbon foam, the fractal carbon foam, and the hybrid fractal carbon foam described above are free-standing and free of a binder. The term "free-standing" refers to non-attachment of the above materials to any additional components, e.g., a substrate or any other support.

One or more binders can be used to provide stronger binding among nanoparticles, monolithic carbon foams, fractal carbon foams, and hybrid fractal carbon foams. The term "binder" covers materials that assist in the adhesion of nanoparticles such as a-OLC nanoparticles and fused OLC nanoparticles. Suitable binders include carboxymethyl cellulose ("CMC"), styrene butadiene rubber ("SBR"), polyvinylidene fluoride ("PVDF"), polytetrafluoroethylene (PTFE), polyimide, sodium silicate, and ammonium polyphosphate.

The monolithic carbon foam and the fractal carbon foam described above are useful in many applications (such as water purification, filtration, catalysts, pseudocapacitors, batteries, carbon capture products, and electrolysis), which require stable materials with high volumetric active surface areas. They are also suitable for energy storage devices due to their high conductivity and great ion accessibility, properties attributable to their unique interconnected pores. Energy storage devices include supercapacitors, pseudocapacitors, and batteries.

Also within the scope of this invention is an electrode for use in an energy storage device, the electrode containing an active material made of the monolithic or fractal carbon foam described above.

Slurry-based electrodes are also contemplated. These electrodes can be fabricated by coating of slurry that contains 70-95% of MCF powder, 5-20% of a binder, and 0-10% of conducting agent on a current collector. The binders are described above.

An energy storage device includes such a negative electrode and such a positive electrode, a separator disposed between the negative and positive electrodes to prevent a short circuit by direct contact thereof, and an electrolyte ionically connecting the electrodes, in which the inner surface of each electrode contacts with the electrolyte and the outer surface of each electrode is covered by a current collector. A suitable material, such as an Al laminated file, can be used to package the energy storage device. A traditional electrode can also be used as a negative or positive electrode as long as one of the negative and positive electrodes is the electrode of this invention.

A pseudocapacitor contains a composite material prepared from a MCF or FCF together with a pseudocapacitive material including metal oxides, transition metal carbides (MXenes), transition metal carbonitrides, and conducting polymers, e.g., $MnO_2$, $RuO_2$, $MoO_3$, $V_2O_5$, $T-Nb_2O_5$, $Ti_3C_2Tx$, $Ti_3C_2$, $Nb_2O_5$, $LiTiNb_2O_7$, $Li_3VO_4$, polypyrrole, and poly(3,4-ethylenedioxy-thiophene). The composite material typically contains 50-80% of the pseudocapacitive material and 20-50% of a MCF or FCF of this invention.

Useful electrolytes include organic solvents such as acetonitrile, propylene carbonate, sulfolane, tetrahydrofuran, diethyl carbonate, γ-butyrolactone, and solutions with quaternary ammonium salts or alkyl ammonium salts, e.g., tetraethylammonium tetrafluoroborate ($N(Et)_4BF_4$), triethyl (methyl) tetrafluoroborate ($NMe(Et)_3BF_4$), 5-azoniaspiro [4.4]nonane, and tetrafluoroborate(1-) ($SBPBF_4$). Aqueous electrolytes are also useful, e.g., water solutions of acids such as sulfuric acid ($H_2SO_4$), alkalis such as potassium hydroxide (KOH), and salts such as quaternary phosphonium salts, sodium perchlorate ($NaClO_4$), lithium perchlorate ($LiClO_4$), and lithium hexafluoride arsenate ($LiAsF_6$). Additional electrolytes include ionic liquids such as 1-ethyl-3-methylimidazolium tetrafluoroborate ($EMIMBF_4$) and 1-butyl-3-methylimidazolium tetrafluoroborate ($BMIMBF_4$).

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever.

All publications, including patent documents, cited herein are incorporated by reference in their entirety.

Example 1

Preparation and Characterization of Non-doped Monolithic Carbon Foams Preparation of Monolithic Carbon Foams Non-doped monolithic carbon foams were prepared according to the process shown in FIG. 1A (100) and described below.

Briefly, OLC nanoparticles (Ketjenblack® EC-600JD, LION Specialty Chemicals Co., Ltd.) of a desired weight (102) were compacted in a mold (104). Subsequently, the compacted OLC nanoparticles were loaded into a SPS chamber, which was then evacuated to subject these nanoparticles to a vacuum (106). Thereafter, the OLC nanoparticles were spark plasma sintered under desired conditions (e.g., a pressure of 110 MPa and a temperature of 600° C. for 30 minutes) (108 and 110) to generate a monolithic carbon foam. A conventional paste-based coating process was optionally used to form a thin film (<100 μm) before the SPS process. The pressure in the SPS chamber was then reestablished at atmospheric pressure, after which the monolithic carbon foam was removed from the SPS chamber (112).

Figure 1B:
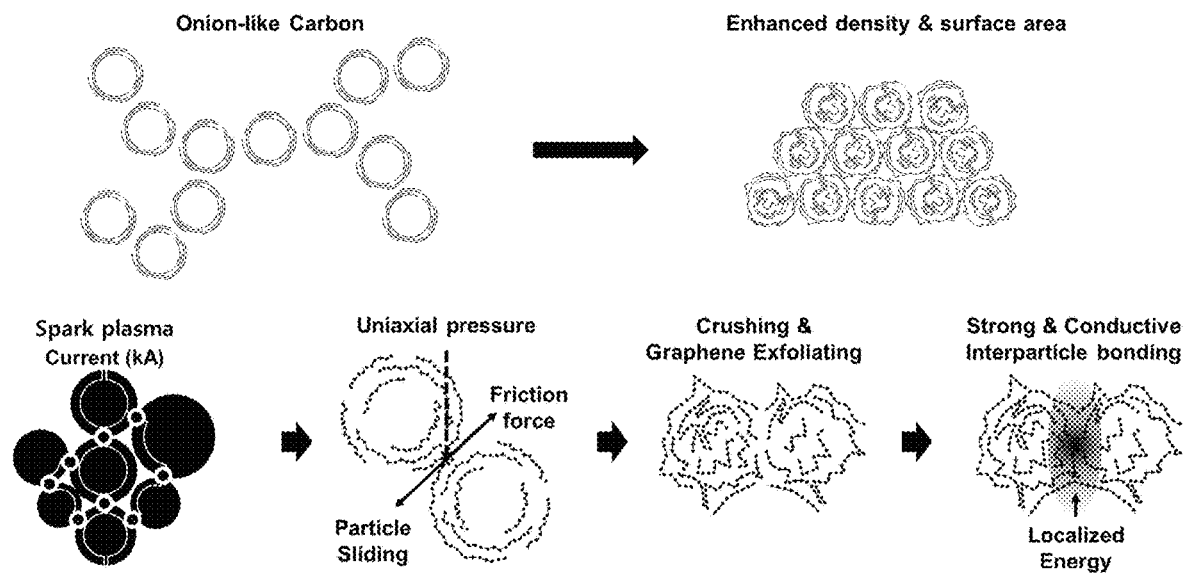
FIG. 1B are schematic illustrations showing that SPS transforms OLC particles into a monolithic carbon foam having enhanced density and surface and strong and conductive interparticle bonding.

As illustrated in FIG. 1B, during the SPS process, the OLC nanoparticles were crushed and restructured through fusing neighboring nanoparticles, thereby resulting in a monolithic carbon foam that was free-standing and was free of a binder. More specifically, the uniaxial pressure applied to the OLC nanoparticles during this process induced particle sliding and frictional force between the nanoparticles, which in turn, led to the crushing and exfoliating of these nanoparticles, thus generating the microporous surface of the monolithic carbon foam. It was unexpected that the localized energy generated by the SPS process induced strong and conductive interparticle bonding in the resulting carbon foam.

Material Density and Volumetric Micropore Surface Area

In general, conventional sintering processes lower the surface area of a sample while increasing its material density. By contrast, as shown in Table 1 below, while the above-described process resulted in monolithic carbon foams having increased densities as compared to OLC nanoparticles, the gravimetric micropore surface and volumetric micropore surface areas of micropore of these foams were unexpectedly higher than those of the nanoparticles.

For example, the OLC nanoparticles had a density of 0.1 g/cc and volumetric micropore surface area of 34.6 $m^2$/g, whereas a monolithic carbon foam, having a density of 1 g/cc, had a volumetric micropore surface area of 497.47 $m^2$/g. In other words, the process of this invention increased the volumetric micropore surface area of the OLC nanoparticles from 34.6 $m^2$/cc to 497.47 $m^2$/cc, i.e., a 1435% enhancement. By contrast, carbon black and graphite flakes, two materials commonly used for energy storage, lost their volumetric micropore surface areas after a similar SPS treatment by 100% and 37%, respectively.

More importantly, the material density could be tuned to fall in the range of 0.4 g/cc to 1.2 g/cc when SPS was operated at a predetermined temperature and a predetermined pressure.

TABLE 1

Gravimetric and volumetric surface areas of SPS-processed monolithic carbon foams

| | OLC nano-particles (0.1 g/cc) | Monolithic carbon foam MCF1 (0.55 g/cc) | Monolithic carbon foam MCF2 (0.75 g/cc) | Monolithic carbon foam MCF3 (1 g/cc) |
|---|---|---|---|---|
| Gravimetric micropore surface area <2 nm ($m^2$/g) | 346.57 | 453.72 | 479.25 | 497.47 |
| Gravimetric total surface area ($m^2$/g) | 1174 | 1083 | 945 | 857 |
| Volumetric micropore surface area <2 nm ($m^2$/cc) | 34.6 | 249.546 | 359.4375 | 497.47 |
| Volumetric total surface area ($m^2$/cc) | 117.4 | 595.65 | 708.75 | 857.00 |

Interconnected Pores

Figure 1C:
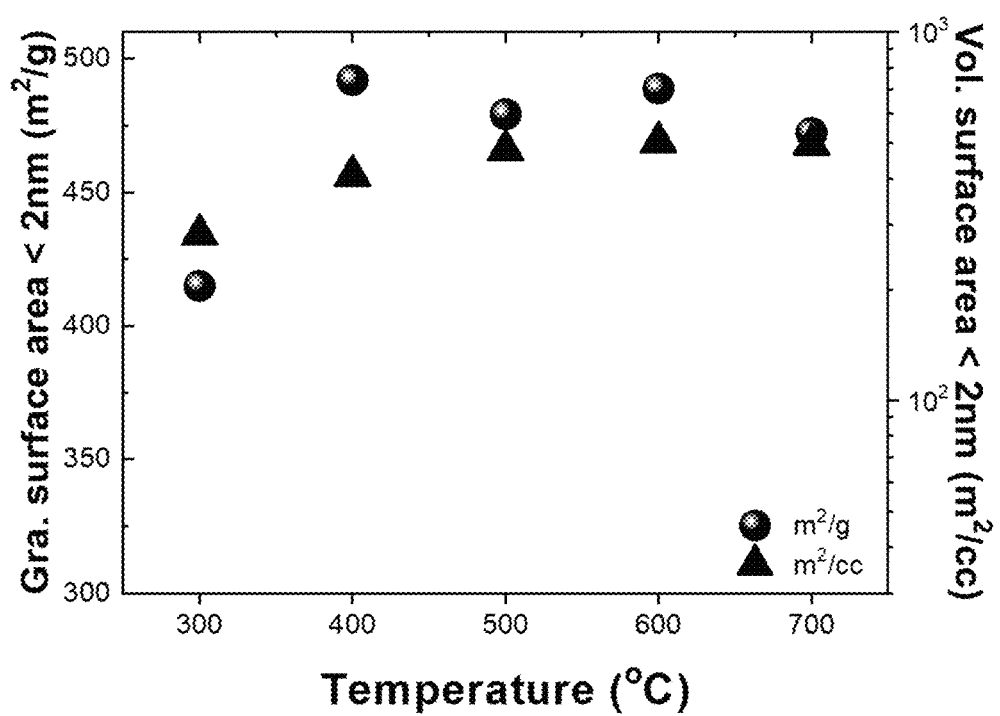
FIG. 1C is a graph showing the gravimetric and volumetric surface areas of monolithic carbon foams prepared at a pressure 80 MPa and at various temperatures, i.e., 300° C.-700° C.

The above-described process provides monolithic carbon foams having micropores and mesopores at various ratios, which are preferred for different applications. For example, a higher percentage of micropores is preferred for energy storage applications, e.g., supercapacitors and batteries, as it maximizes energy density. On the other hand, a greater percentage of mesopores is preferred for applications requiring higher power density, as it permits faster charging and discharging. A suitable combination of micropores and mesopores is crucial for optimizing both the energy density and the power density of a supercapacitor or a battery. Through the SPS process, the ratio of micropores and mesopores can be controlled by adjusting the temperature and pressure at which the process is performed. For example, as shown in FIG. 1C, both the gravimetric and volumetric surface areas of a monolithic carbon foam were enhanced by increasing the temperature, e.g., from 300° C. to 700° C., at which the SPS process was performed, while keeping the pressure at 80 MPa.

Figure 1D:
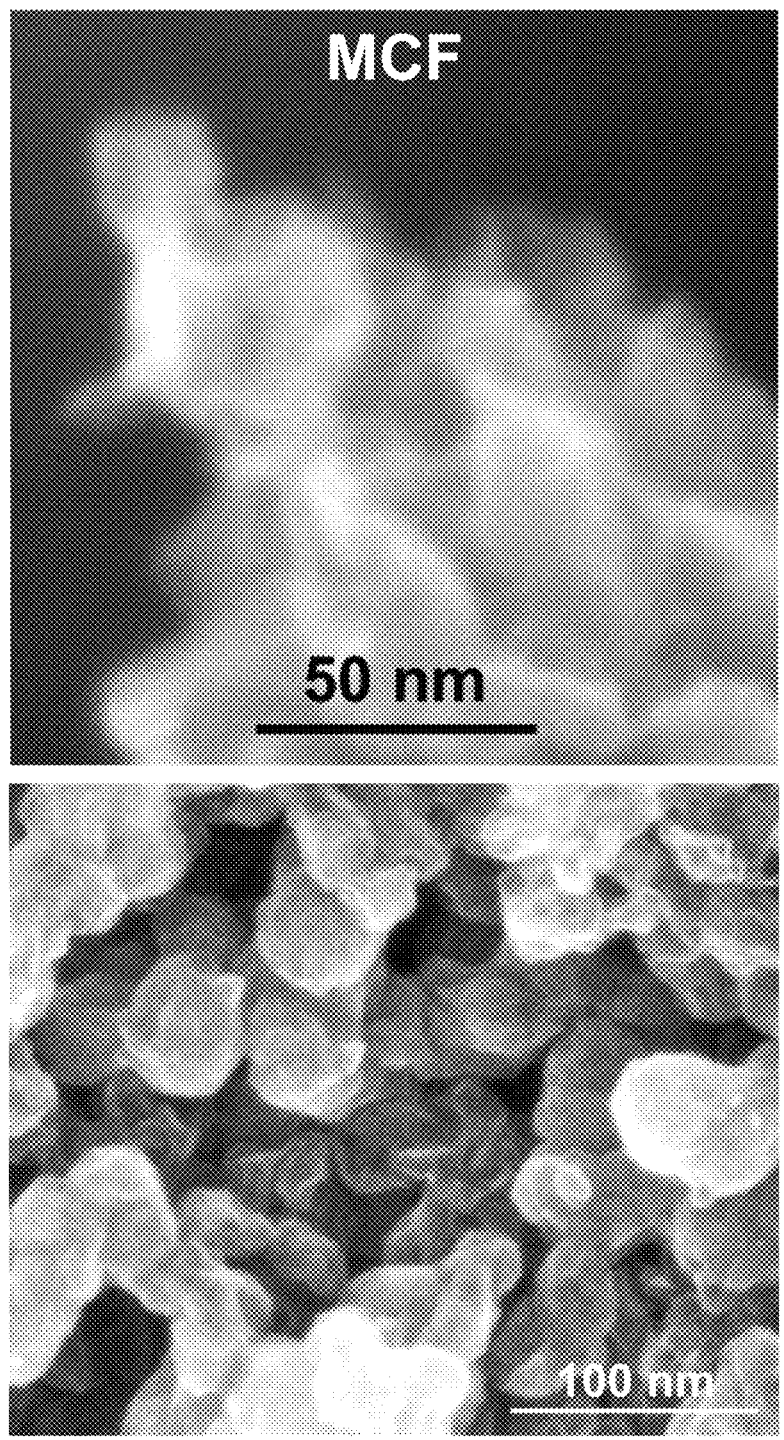
FIG. 1D is a scanning electron microscope ("SEM") image of a monolithic carbon foam prepared at a temperature of 500° C. and a pressure of 120 MPa.
Figure 1E:
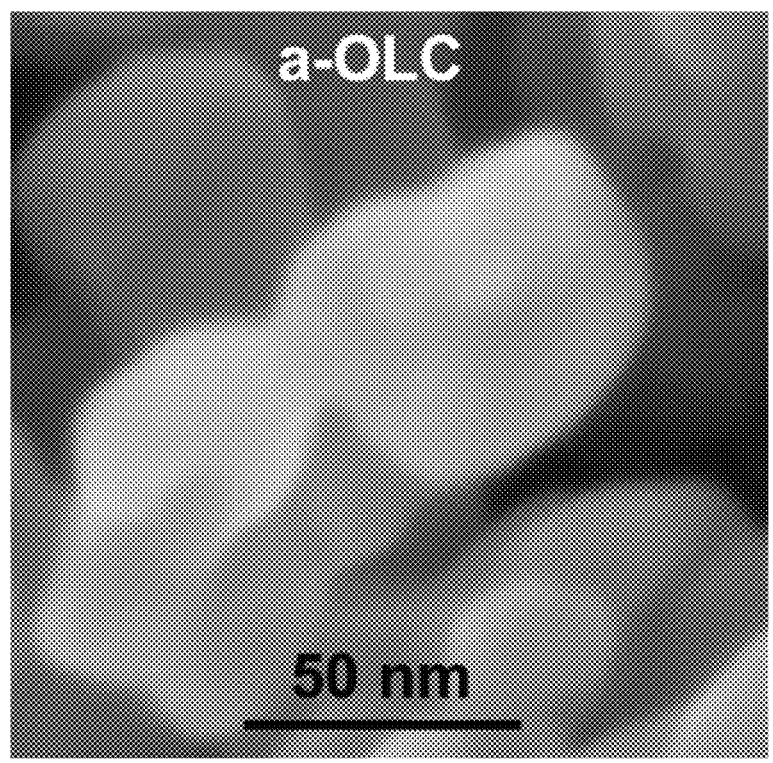
FIG. 1E shows SEM images of untreated amorphous onion-like carbon nanoparticles and fused onion-like carbon nanoparticles.

The micropores and mesopores were interconnected and distributed within the monolithic carbon foam containing fused OLC nanoparticles as shown in an SEM image. See FIG. 1D. Unlike the starting material a-OLC nanoparticles, fused OLC nanoparticles formed in the SPS process each had a crumpled surface and graphene-like flakes. See FIG. 1E.

Interconnected pores were further studied using quenched solid density functional theory analysis for pores having a size of 10 nm or smaller and using TEM tomography for pores larger than 10 nm. 3D tomographic reconstructions were segmented into carbonaceous and porous regions using MCF1, which had a density of 0.55 g/cc. The 3D pore structure showed a 100% accessibility with the aid of small branching pore connections. The same analyses were performed on MCF3 having a density as high as 1 g/cc. MCF3 had a 97% accessibility, showing only 3% of inaccessible (i.e., isolated) pores. Interestingly, in MCF1 and MCF3, the average distance from a carbonaceous region to its nearest porous region was 7.2 nm and 9.2 nm, respectively. The results suggest that, independent of material density, the extensive mesoporous network in both MCF1 and MCF3 contained a large volume of highly accessible, micropore-rich surface regions. The unique mesoporous network made monolithic carbon foam a suitable material for building a supercapacitor having a high volumetric capacitance.

Pore size distribution was obtained through analysis of nitrogen adsorption-desorption isotherms. As a starting material, a-OLC nanoparticles were provided in an agglomerated state, having mesopores sized in the range of 2 nm to 20 nm. The size distribution represents pores having random packing structure.

Figure 1F:
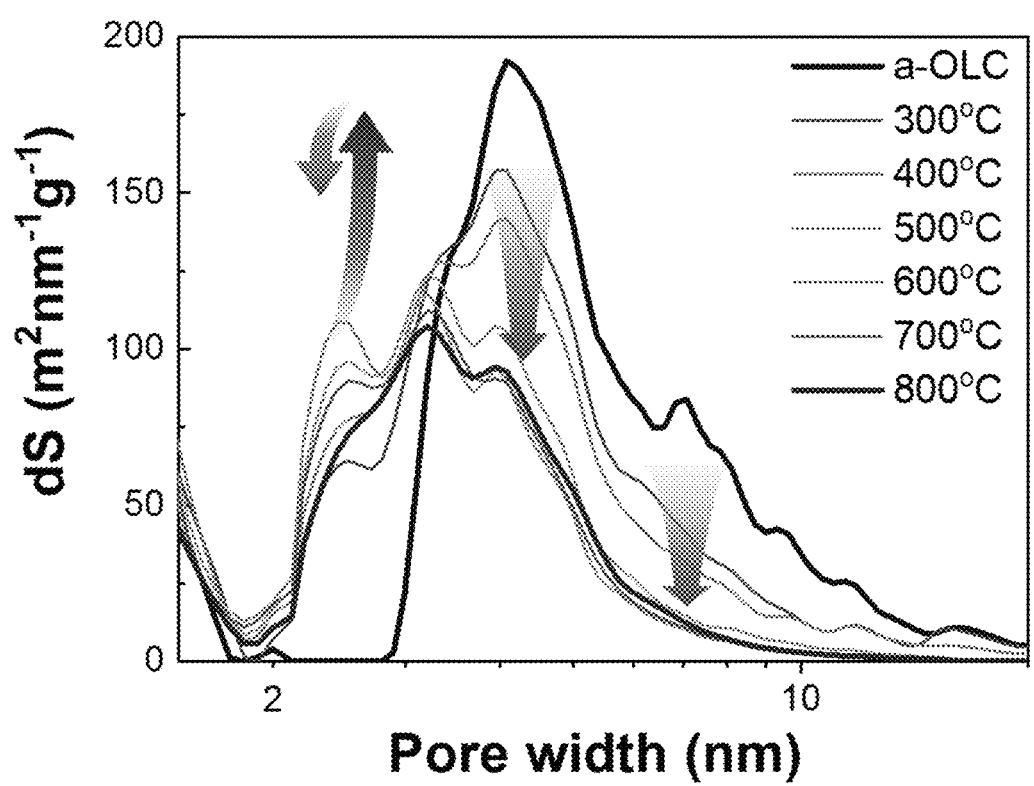
FIG. 1F is a graph showing pore size distribution of MCFs as a function of the SPS process temperature at 120 MPa using quenched solid density functional theory analysis.

During an SPS treatment, the mesopore sizes of a-OLC nanoparticles decreased in responding to the pressure and the heat applied on the a-OLC agglomerated nanoparticles. A new pore structure was formed having a new size distribution. The results indicate that the new pore structure was a random close packing ("s-RCP") structure, very different from HCP and BCC structures. FIG. 1F illustrates the pore size distribution of six MCF examples, i.e., MCF4 to MCF9, as compared to the a-OLC agglomerated nanoparticles. MCF4 was prepared following the SPS procedure described above at a temperature of 300° C. and a pressure of 120 MPa. MCF5, MCF6, MCF7, MCF8, and MCF9 each were prepared in a similar way except at a temperature of 400° C., 500° C., 600° C., 700° C., and 800° C., respectively. In these examples, pores of 5 nm to 20 nm decreased in size at a higher SPS temperature. Pores of 2 nm to 5 nm increased in number.

In another study, MCF examples were prepared under different pressures and at a constant temperature. It was found that pore sizes were smaller at higher pressures.

As such, the SPS method of this invention allows controlling the pore size and its distribution by adjusting SPS temperature and pressure.

Chemical Purity

Impurities can be introduced to monolithic carbon foam by surface oxidization to form C—O bonds. Chemical purity typically suffers when surface areas increase. XPS analysis shows that monolithic carbon foam of this invention had an intensive carbon peak at 284 eV and an insignificant oxygen peak, indicating that monolithic carbon foam, unlike a-OLC nanoparticles, had a very small amount of C—O bonds. Furthermore, thermogravimetric analysis shows chemical stability of monolithic carbon foam as it had more than 99% weight retention after heating to 1,000° C. in an argon environment. As a comparison, rGO had a weight loss of more than 20% after heating to 800° C.

Mechanical Stability

A study was performed to compare the mechanical stability of the monolithic carbon foam prepared by the SPS method described above and the carbon foams prepared by three conventional methods, i.e., (1) hot-pressing at 800° C. and 40 MPa, (2) cold-pressing at 1 GPa followed by annealing at 800° C., and (3) cold-pressing at 1 GPa. More specifically, the SPS-processed monolithic carbon foam and the hot-pressed/cold-pressed monolithic carbon foams were sonicated in isopropyl alcohol (IPA) for 5 minutes (sonication power of 600 W). All three samples containing carbon foams prepared by the conventional methods disintegrated and dispersed, as evidenced by tinting of IPA. By contrast, the sample containing SPS-processed monolithic carbon foam remained clear, indicating that this monolithic carbon foam, mechanically stable, was intact after sonication.

Figure 2A:
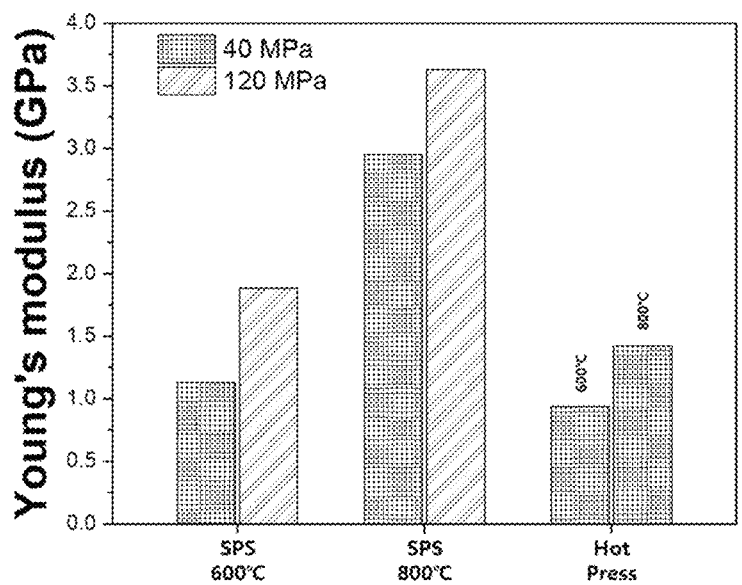
FIG. 2A is a graph showing the Young's moduli of a monolithic carbon foam prepared by the SPS process and a carbon foam prepared by a conventional hot-pressing process.

To quantify the differences in mechanical stability between monolithic carbon foams prepared by the above-described SPS process and carbon foams prepared by the conventional hot-pressing process, a second study was conducted to measure the Young's moduli of monolithic carbon foams prepared by the six processes: (1) MCF10, SPS-processed at 600° C. and 40 MPa, (2) MCF11, SPS-processed at 600° C. and 120 MPa, (3) MCF12, SPS-processed at 800° C. and 40 MPa, (4) MCF13, SPS-processed at 800° C. and 120 MPa, (5) Comparative 1, hot-pressed at 600° C. and 40 MPa, and (6) Comparative 2, hot-pressed at 800° C. and 40 MPa. The results of this study, shown in FIG. 2A, demonstrate that the SPS-processed monolithic carbon foams unexpectedly had Young's moduli greater than the hot-pressed carbon foams.

The results of these two studies demonstrate the unexpected mechanical stability of SPS-processed monolithic carbon foam of this invention, as compared to carbon foams prepared by prior art methods.

Vickers Hardness

The Vickers Hv method, well known in the field, was used to test the hardness of the monolithic carbon foam. For a description of this method, see Hintsala et al., JOM 70, 494-503 (2018). Six MCF examples of this invention were prepared, i.e., MCF14-MCF19. The SPS conditions and the results are shown in Table 2 below. MCF19 had a Vickers Hv hardness as high as 935 MPa. Each of MCF14-18 had a high Vickers Hv hardness of 51 MPa to 935 MPa. By contrast, a commercial activated carbon electrode had a Vickers Hv hardness of 71 MPa, only 10% that of MCF19. Nuclear graphite, a material known for its great hardness, had a Vickers Hv hardness of 190 MPa. Of note, nuclear graphite does not contain pores.

TABLE 2

Vickers hardness

| Monolithic carbon foam | SPS Temperature ° C. | SPS Pressure MPa | Vickers hardness Hv MPa |
|---|---|---|---|
| MCF14 | 300 | 120 | 51 |
| MCF15 | 400 | 120 | 135 |
| MCF16 | 500 | 120 | 309 |
| MCF17 | 600 | 120 | 325 |
| MCF18 | 700 | 120 | 405 |
| MCF19 | 800 | 120 | 935 |
| AC electrode | — | — | 71 |
| Nuclear graphite | — | — | 190 |

Conductivity

Figure 2B:
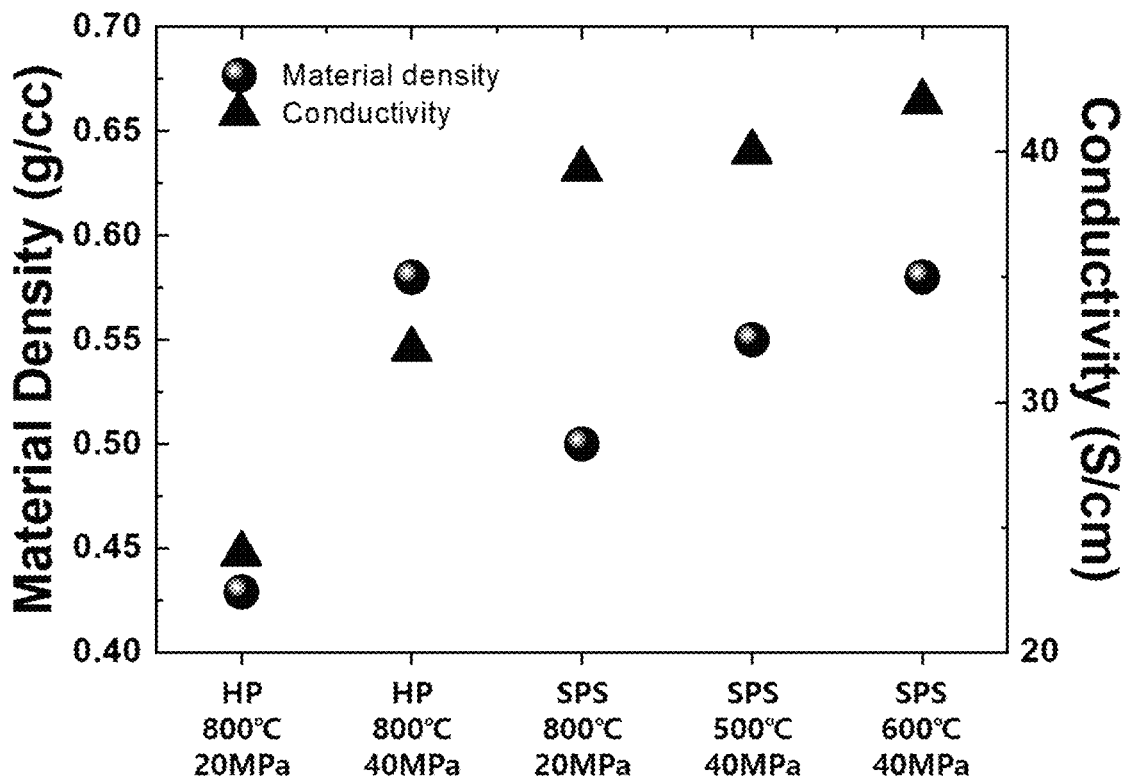
FIG. 2B is a graph showing the conductivity and material density of SPS-processed monolithic carbon foams and conventional hot-pressed monolithic carbon foams.

A different study was conducted to compare the conductivities and densities of the SPS-processed monolithic carbon foams prepared under three conditions, i.e., 800° C. and 20 MPa (i.e., MCF20), 500° C. and 40 MPa (i.e., MCF21), and 600° C. and 40 MPa (i.e., MCF10), with two conventional hot-pressed carbon foams, i.e., hot-pressed at 800° C. and 20 MPa and at 800° C. and 40 MPa. The results of this study, shown in Table 3 below and in FIG. 2B, indicate that the SPS-processed monolithic carbon foams, regardless of preparation conditions, unexpectedly had higher conductivities than the hot-pressed carbon foams. Under the same condition, i.e., 800° C. and 20 MPa, the SPS-processed monolithic carbon foams unexpectedly had higher density than the hot-pressed carbon foams.

Ten more MCF examples (i.e., MCF22-MCF31) were prepared each using a temperature and a pressure shown in Table 4 below. Their conductivities were measured. See Table 4. Monolithic carbon foam prepared at a higher temperature had a greater conductivity than monolithic carbon foam prepared at a lower temperature. Similarly, monolithic carbon foam prepared at a higher pressure had a greater conductivity as compared to monolithic carbon foam prepared at a lower pressure.

TABLE 3

Conductivities and densities of SPS-processed monolithic carbon foams and hot-pressed monolithic carbon foams

|  | Hot-pressed (800° C., 20 MPa) | Hot-pressed (800° C., 40 MPa) | SPS-processed MCF20 (800° C., 20 MPa) | SPS-processed MCF21 (500° C., 40 MPa) | SPS-processed MCF10 (600° C., 40 MPa) |
|---|---|---|---|---|---|
| Density (g/cc) | 0.429 | 0.58 | 0.5 | 0.55 | 0.58 |
| Conductivity (S/cm) | 23.94 | 32.12 | 39.31 | 40 | 42 |

TABLE 4

Conductivities of certain monolithic carbon foams

| Monolithic carbon foam | Temperature ° C. | Pressure MPa | Conductivity S/cm |
|---|---|---|---|
| MCF22 | 400 | 80 | 46 |
| MCF 23 | 500 | 80 | 61 |
| MCF24 | 600 | 80 | 74 |
| MCF25 | 700 | 80 | 80 |
| MCF26 | 800 | 80 | 112 |
| MCF27 | 400 | 120 | 60 |
| MCF28 | 500 | 120 | 70 |
| MCF29 | 600 | 120 | 88 |
| MCF30 | 700 | 120 | 115 |
| MCF31 | 800 | 120 | 124 |

Mesopore Structure

The local atomic structure of a fused OLC nanoparticle of MCF26 was studied using electron energy loss spectroscopy (EELS). EELS mapping analysis shows that the fused OLC nanoparticle of MCF had a three-layered structure, namely, a crumpled graphene outer layer, a graphite middle layer, and a diamond-like core.

Figure 1G:
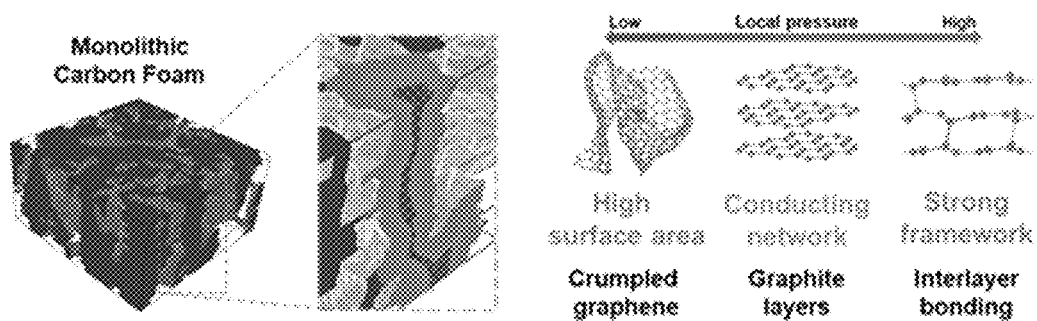
FIG. 1G is an illustration of a three-layered structure of a fused onion-like carbon nanoparticle based on an electron tomography study.

The crumpled graphene outer layer formed the surface of the MCF nanoparticle facing mesopores. It had the lowest density among the three layers. Further, $sp^2$ orbitals dominated this layer as shown in FIG. 1G, which was obtained using low-loss EELS and core-loss EELS of carbon K edge, respectively. The graphene layer, crumpled and exfoliated, was observed without stacking order. The crumpled graphene outer layer gave rise to MCF's high micropore surface area and chemical stability.

Figure 3:
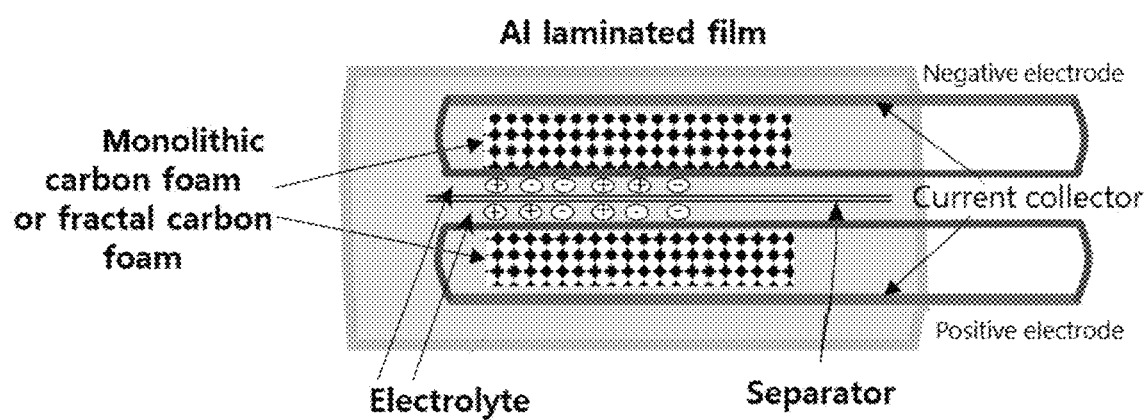
FIG. 3 is a schematic illustration of an exemplary pouch-cell type supercapacitor, which contains a monolithic carbon foam or a fractal carbon foam.

Covered by the crumpled graphene outer layer was the graphite middle layer, which was highly conductive and had a density greater than the crumpled graphene outer layer. The EELS spectrum shows blueshift in the peak positions in comparison to those of the crumpled graphene outer layer, indicating the start of graphitic ordering due to the onset of interlayer interactions as described in Nelson et al., Nano Lett 14, 3827-31 (2014). As graphite is highly conductive, this graphite middle layer contributed to the high conductivity. Further, EELS mapping analysis shows a linear increase of an absolute intensity, confirming the increase of material density as compared to the crumpled graphene layer. Underneath the conductive graphite middle layer was the diamond-like core, where the intensity of $\pi \rightarrow \sigma^*$ increased and that of $\pi \rightarrow \pi^*$ decreased, indicating that, unlike the outer and middle layers, the core had an $sp^a$ orbitals-rich structure. Indeed, the EELS spectrum of the diamond-like core is similar to that of the neutron-irradiated graphite used in nuclear reactors as described in Brown, Carbon (New York) 6, 27-30 (1968). It is well known that neutron irradiation deforms the graphite structure into a diamond-like structure, thereby increasing its hardness and compressive strengths. See Neighbour, Journal of Physics D, Applied Physics 33, 2966-72 (2000), and Mason et al., Carbon (New York) 5, 493-506 (1967). Capacitance retention The monolithic carbon foam can be used as an electrode for supercapacitors that do not contain conductive additives and binders. OLC nanoparticles were compacted in a mold. Subsequently, the compacted OLC nanoparticles were loaded into a SPS chamber, which was then evacuated to subject these nanoparticles to a vacuum. Thereafter, the OLC nanoparticles were spark plasma sintered under a pressure of 30 MPa and a temperature of 600° C. for 10 minutes Eliminating conductive additives and binders from an electrode is desirable, as they reduce energy density and hinder performance severely. FIG. 3 shows an exemplary pouch-cell type supercapacitor containing a monolithic carbon foam electrode (or a fractal carbon foam, preparation of which is described in Example 2 below). The supercapacitor was constructed based on a commercial laboratory test setup for supercapacitor analysis.

The capacitance retention of an exemplary supercapacitor, indicative of its lifetime, was compared to a commercial supercapacitor having a binder-based paste coated activated carbon electrode (3.0 V, 70° C., SBPBF4/PC electrolyte). The results are shown in Table 5 below. Of note, capacitance retention was calculated by:

$$\frac{\text{Capacitance after reliability test}\left(\frac{F}{g}\right)}{\text{Capacitance of As prepared device}\left(\frac{F}{g}\right)} \times 100$$

TABLE 5

Capacitance retention for supercapacitors containing SPS-processed monolithic carbon foam or activated carbon

| Supercapacitor | Load time (hrs.) | | | |
|---|---|---|---|---|
| | 0 | 150 | 300 | 500 |
| SPS-processed monolithic carbon foam (%) | 100 | 102 | 100 | 100 |
| Activated carbon (%) | 100 | 85 | 82 | 80 |

As shown in Table 5 above, after a 500-hour reliability test conducted at 3.0 V and 70° C., the supercapacitor containing the monolithic carbon foam unexpectedly had a capacity retention of 100%, whereas the activated carbon device had a capacity retention of only 80%. These results indicate that, unlike the commercial supercapacitor, the monolithic carbon foam-containing supercapacitor is suitable for use at a rated voltage of 3.0 V.

Example 2

Preparation and Characterization of a Fractal Carbon Foam

A fractal carbon foam was prepared by a procedure adapted from that used to prepare monolithic carbon foams set forth in Example 1 above.

More specifically, a monolithic carbon foam was crushed into a powder having a grain size of a few hundred nanometers to a few microns. The monolithic carbon foam powder was then subjected to the SPS process described in Example 1.

Figure 4A:
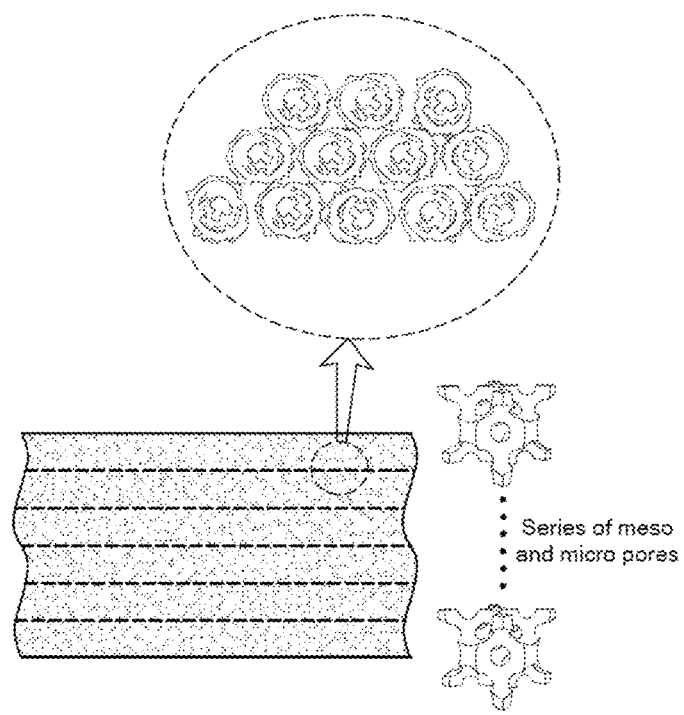
FIG. 4A is a schematic illustration of a monolithic carbon foam according to an embodiment of the present invention. The monolithic carbon foam, formed from OLC nanoparticles, has a pore structure characterized by a series of mesopores and micropores.
Figure 4B:
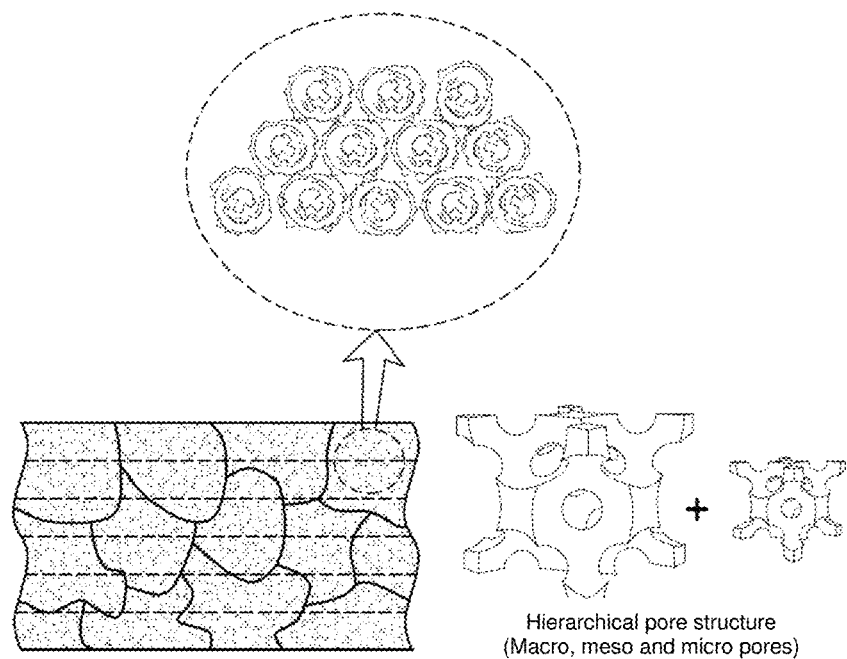
FIG. 4B is a schematic illustration of a fractal carbon foam according to an embodiment of the present invention. This fractal carbon foam, formed from monolithic carbon foam powder, has a hierarchical pore structure characterized by macropores connected to a series of mesopores and micropores in the monolithic carbon foam powder.

The fractal carbon foam thus prepared had an interconnected hierarchical pore structure, in which macropores were connected to the mesopores and micropores contained in the monolithic carbon foam powder. Compared to the pore structure of the monolithic carbon foam shown in FIG. 4A, which did not contain a macropore-network, the pore structure of the fractal carbon foam shown in FIG. 4B included macropore-network that provided a greater pore accessibility. The greater pore accessibility of the fractal carbon foam facilitated diffusion of ions and molecules. Indeed, Nyquist plots of a 100 μm monolithic carbon foam ("MCF") electrode and a 100 μm fractal carbon foam ("FCF") electrode (see FIG. 5A, inset) show that the diffusion speed of ions was faster in the FCF electrode, as evidenced by the steeper slope of its Nyquist plot.

Figure 5A:
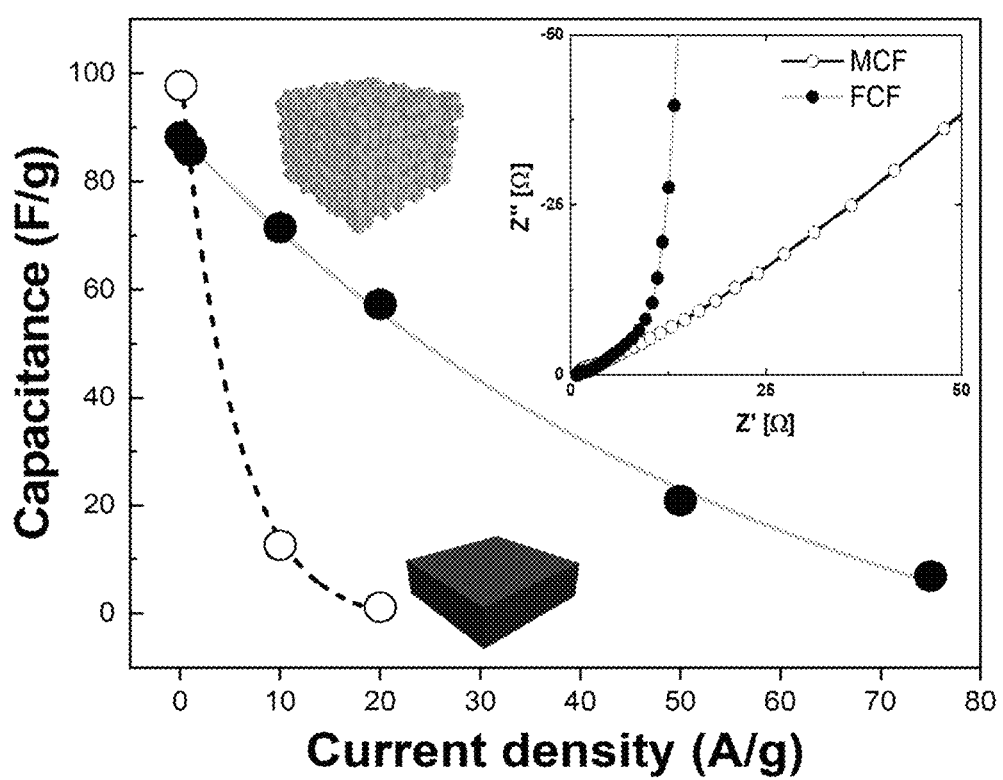
FIG. 5A is a graph showing capacitance and current density performance of two supercapacitors of this invention including their EIS curves. The inset is an overlay of Nyquist plots of the monolithic carbon foam ("MCF") electrode and the fractal carbon foam ("FCF") electrode showing the diffusion speed of ions within these electrodes, wherein a steeper slope corresponds to a higher diffusion rate.
Figure 5B:
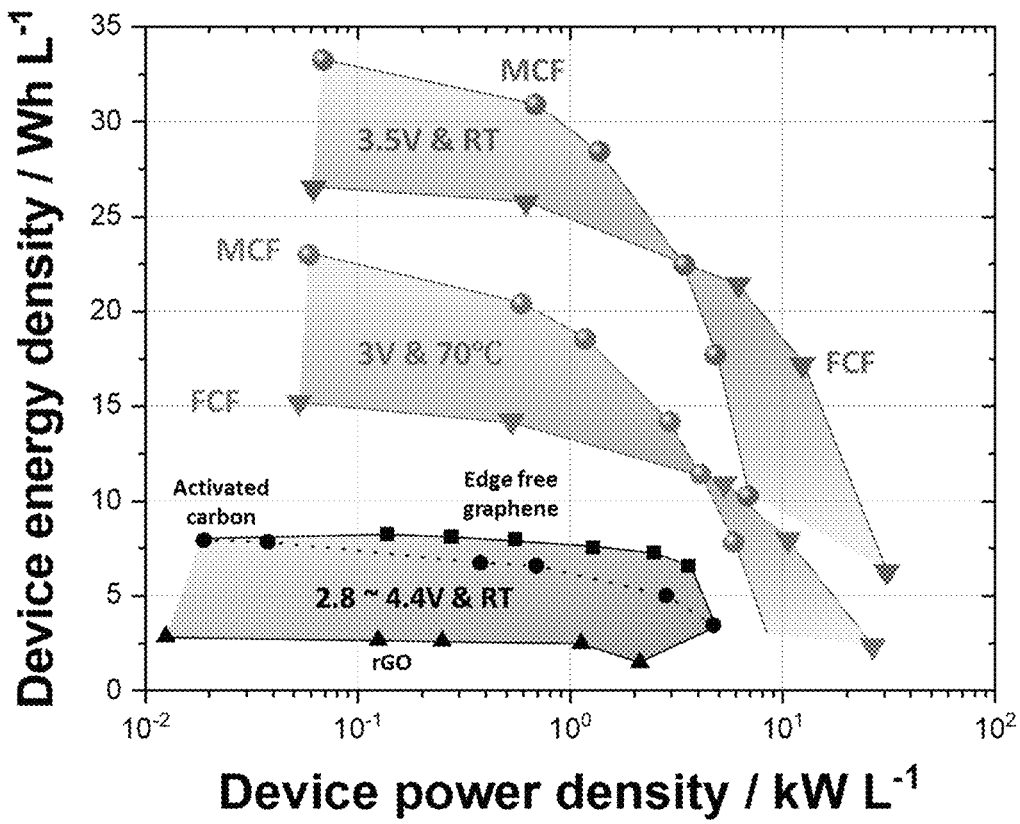
FIG. 5B is a volumetric Ragone plot of energy density and power density performance of two supercapacitors of this invention (i.e., MCF and FCF) as compared to known supercapacitors containing different electrode materials, i.e., activated carbon, edge free graphene, and reduced graphite oxide ("rGO").

A study was conducted to compare the device performance of supercapacitors containing different electrode materials, i.e., MCF, FCF, activated carbon, edge free carbon, and reduced carbon oxide ("rGO"). The results are shown in FIG. 5B, a Ragone plot. It was found that the fractal graphene foam, while having lower energy density as compared to the monolithic graphene foam, had a higher power density due to its greater pore accessibility. Importantly, both the fractal graphene foam and the monolithic graphene foam had higher energy and power densities as compared to activated carbon, edge free carbon, and rGO. In other words, the carbon foams of this invention, both monolithic and fractal, are unexpectedly superior to the other carbon materials in supercapacitor applications.

Example 3

Preparation and Characterization of Hybrid Monolithic Carbon Foams

Two hybrid monolithic carbon foams, i.e., a $MoS_2$/carbon hybrid monolithic carbon foam and a Si/carbon hybrid monolithic carbon foam were prepared via procedures described below.

For the $MoS_2$/carbon hybrid monolithic carbon foam, a $MoS_2$/carbon precursor material containing Ketjenblack (AkzoNobel; $EC_{600}$ grade) and $MoS_2$ was first prepared. Briefly, 10 mg of Ketjenblack and 20 mg of ammonium tetrathiomolybdate (Sigma-Aldrich) were respectively dispersed in 10 mL and 2 mL of N,N-dimethylformamide ("DMF"). Both dispersions were sonicated for 30 minutes, mixed together, and then sonicated for 2 hours to allow for the Ketjenblack to be thoroughly impregnated with ammonium tetrathiomolybdate. The resulting solution was transferred into a 25 mL Teflon-lined stainless steel autoclave and tightly sealed. The autoclave was heated at 200° C. for 15 hours and allowed to cool to room temperature. The resulting $MoS_2$/carbon precursor material was collected by centrifugation and washed with several aliquots of ethanol and deionized water. The washed precursor material was dried overnight in an oven at 60° C.

Figure 6:
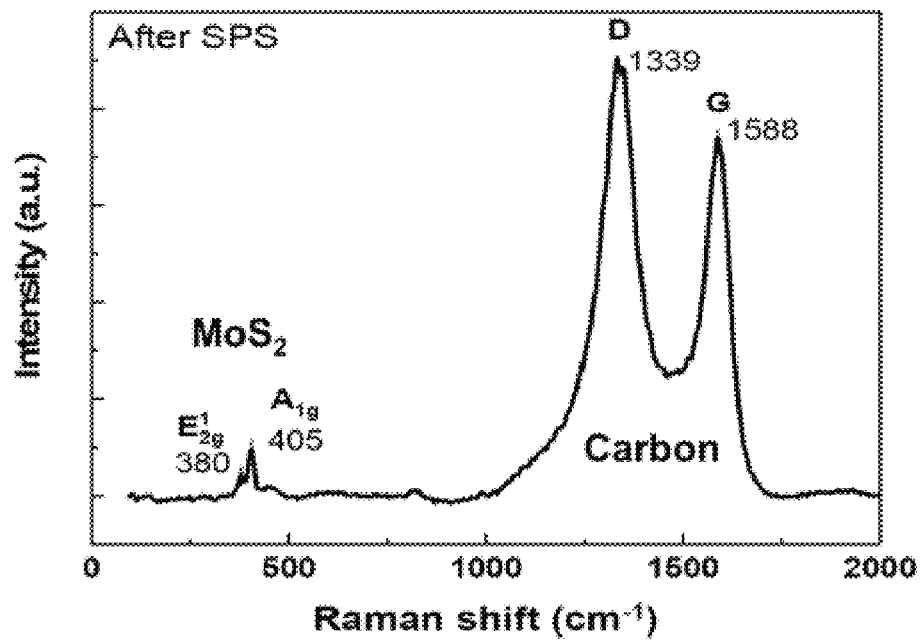
FIG. 6 is a Raman spectrum of a $MoS_2$/carbon hybrid monolithic carbon foam.

To obtain the $MoS_2$/carbon hybrid monolithic carbon foam, a spray-gun was connected with a nitrogen gas supply and mounted at 10 cm from the tip of the nozzle above a hotplate, where Mo circular foils (Alfa Aesar; 14 mm diameter, effective area ~1.4 $cm^2$) were secured with heat resistance tape. The Mo foils were used as current collectors. The $MoS_2$/carbon precursor material was dispersed in DMF and used as the feedstock for spraying. The hotplate was heated at 190° C. to dry the Mo foils. Mass loading of up to 1 mg/$cm^2$ was obtained by varying the duration of spraying. To perform the SPS process, the electrodes were sandwiched between graphite foils then loaded into a tungsten carbide mold. SPS was conducted at 500° C. and 600° C. with a uniaxial pressure of 2-30 MPa for 30 minutes under vacuum. The mold was cooled rapidly afterwards with the cooling water system in the furnace, after which the hybrid monolithic carbon foam thus formed was removed from it. The resulting $MoS_2$/carbon hybrid monolithic carbon foam was characterized by Raman spectroscopy, which confirmed the presence of both $MoS_2$ and carbon in the foam. See FIG. 6.

For the Si/carbon monolithic carbon foam, a precursor solution containing Si nanoparticles ("SiNP"), trimethoxymethylsilane ("TMMS"), and Ketjenblack was first prepared prior to the SPS process. More specifically, 20 mg Si nanopowder (US Research Nanomaterials, Inc.; diameter=30 nm-50 nm) was dispersed in 40 ml ethanol by batch sonication for 2 hours, after which 1 mL of TMMS (Sigma Aldrich; 98%) was added to the solution and sonicated for 1 hour. Subsequently, 6.6 mg of Ketjenblack (AkzoNobel; $EC_{600}$ grade) was dispersed in 40 ml of isopropyl alcohol ("IPA") for 2 hours to obtain a homogeneous solution. The two solutions were then mixed together and sonicated for 1 hour to obtain a well-dispersed SiNP/TMMS/Ketjenblack precursor solution.

To obtain the Si/carbon hybrid monolithic carbon foam, Mo circular foils (Alfa Aesar; 14 mm diameter, effective area ~1.4 $cm^2$) were placed on a hotplate heated set to 50° C. A spray-gun was then connected with a nitrogen gas supply and mounted at 10 cm (from the tip of the nozzle) above the hotplate. The SiNP/TMMS/Ketjenblack precursor solution was slowly sprayed on the Mo foil to drive out ethanol and IPA, thereby obtaining a Si/Ketjenblack films on the foil. The Si/Ketjenblack films were then subjected to the SPS process, which was performed at 800° C. and a uniaxial pressure of 2-30 MPa for 30 minutes under vacuum.

The cycling performance of the two hybrid monolithic carbon foams as electrodes in Li-ion batteries were tested. It was found that these two hybrid foams unexpectedly retained high capacity after as many as 800 cycles, indicating that these materials are excellent electrode materials for Li-ion battery applications.

Example 4

Preparation of Supercapacitors

Supercapacitors of this invention were fabricated using both the MCF1 as prepared above and commercially available SBPBF4/PC electrolyte. They were compared with commercially available supercapacitors that were activated carbon ("AC")-based having a density of 0.5 g/cc and containing the same electrolyte. According to the International Electrotechnical Commission standards 62391-1 and -2, the supercapacitor performance (e.g., device lifetime) was evaluated at a high temperature and the maximum working voltage. See Kotz et al., Journal of Power Sources 195, 923-928 (2010), and Weingarth et al., Journal of Power Sources 225, 84-88 (2013). Device lifetime is defined as the maximum time period during which a supercapacitor retains at least 70% of its initial capacitance as a function of the maximum working voltage and the maximum temperature allowable for its use.

Figure 7:
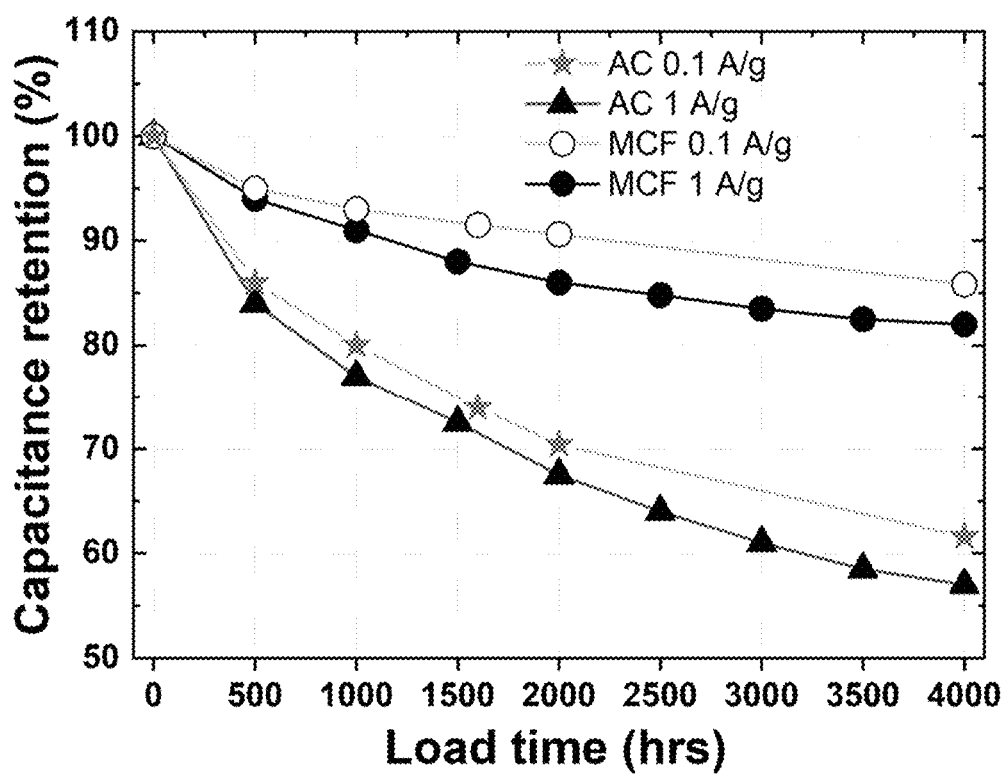
FIG. 7 is a graph showing capacitance retention at two scan rates for a supercapacitor of this invention and a commercially available active carbon-based supercapacitor during a stability test using IEC standards 62391-1 and 62391-2, in which a cell is kept at 70° C. with 2.5 V.

At 2.5V, 70° C., and 1 A/g discharge rate, the MCF supercapacitor of this invention retained 82% of its initial capacitance after 4,000 hours of testing. By contrast, the AC supercapacitor dropped below 70% after 1,500 hours. See FIG. 7. By extrapolating, the MCF supercapacitor lifetime was estimated to be 10,000 hours, almost 10 folds that of the AC supercapacitor.

Tested under harsh conditions, e.g., at 3V/70° C. and at 2.5V/100° C., the MCF supercapacitor retained 92.5% and 78%, respectively, of its capacitance after 1,000 hours. By contrast, the AC supercapacitor failed at 140 hours and 55 hours, under the same two conditions. The MCF supercapacitor also had a superior performance in the electrochemical impedance spectroscopy ("EIS") measurement. It preserved the typical Nyquist plots of a supercapacitor with an equivalent series resistance ("ESR") change of 100% at 1 kHz and up to 2.5V/100° C. As a comparison, the AC supercapacitor had a 300% increase at 3V/70° C. and completely lost its shape at 2.5V/100° C. The results indicate that MCF supercapacitor of this invention has a better power performance than the AC supercapacitor.

Two supercapacitors of this invention were prepared, one using a fractal MCF ("FCF", density 0.9 g/cc), and another using a he-MCF (1 g/cc). They were then tested to establish their performance limits, namely, maximum device working voltages for high volumetric device performance at room temperature. Both supercapacitors retained 100% capacitance at room temperature for 400 hours during the voltage up to 3.5V.

As expected, the scan rate performance depended on material density. At low scan rates (e.g., 0.1 A/g), capacitances are similar for both supercapacitors. At high scan rates (e.g., higher than 1 A/g), FCF shows higher capacitances than the he-MCF, indicating higher ion diffusion rate. The same phenomenon was also observed. See the inset of FIG. 5A for the Nyquist plots of the electrodes prepared from 100 um of MCF and FCF. FIG. 5A shows a comparison of ion diffusion speeds between the high-density MCF supercapacitor and the FCF supercapacitor, where faster diffusion was associated with a steeper characteristic slope. As the FCF had a lower material density, it had more sub-micron sized, well-connected macropores as compared to the high-density MCF.

Volumetric Ragone plots were obtained for both the high-density MCF supercapacitor and the FCP supercapacitor, as well as commercially available AC supercapacitors and graphene based supercapacitors. See FIG. 5B. The high-density MCF supercapacitor had a maximum volumetric device energy density of 34 $Wh \cdot L^{-1}$ at 3.5 v and room temperature. The FCF supercapacitor had a maximum device power density of 30 $kW \cdot L^{-1}$, also at 3.5 v and room temperature. It is possible to increase these numbers depending on specific uses. In particular, the energy density can be greatly improved by designing MCF using a predetermined temperature and a predetermined pressure in the SPS preparation method.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A monolithic carbon foam formed from a plurality of onion-like carbon (OLC) nanoparticles fused together, wherein the monolithic carbon foam has a volumetric micropore surface area of 200 $m^2$/cc to 600 $m^2$/cc and an electrical conductivity of 20 s/cm to 140 s/cm; the monolithic carbon foam contains a diamond-like core, a crumpled graphene layer, and a conductive graphite layer; the crumpled graphene layer is an outer layer; and the conductive graphite layer is a middle layer being in contact with both the diamond-like core and the crumpled graphene layer.

2. The monolithic carbon foam of claim 1, wherein the monolithic carbon foam has a Young's modulus of 1 GPa to 4 GPa.

3. The monolithic carbon foam of claim 1, wherein the monolithic carbon foam has a volumetric micropore surface area of 200 $m^2/cc$ to 500 $m^2/cc$, an electrical conductivity of 40 s/cm to 75 s/cm, and a Young's modulus of 1 GPa to 3 GPa.

4. The monolithic carbon foam of claim 1, further comprising a material selected from the group consisting of a non-OLC-based material, an oxide material, a metal, and a semiconductor material.

5. The monolithic carbon foam of claim 4, wherein the material is in the form of a fiber, a tube, a hollow sphere, a wire, a sheet, or a powder.

6. The monolithic carbon foam of claim 4, wherein the material is a non-OLC-based material containing activated carbon, molybdenum oxide, silicon, or molybdenum disulfide in the form of a sheet.

7. The monolithic carbon foam of claim 1, wherein the monolithic carbon foam has a density of 0.4 g/cc to 1.2 g/cc.

8. The monolithic carbon foam of claim 1, wherein the fused OLC nanoparticles each have a diameter of 2 nm to 50 nm.

9. The monolithic carbon foam of claim 1, wherein the monolithic carbon foam has a Vickers hardness of 18 MPa to 935 MPa.

10. The monolithic carbon foam of claim 1, wherein the monolithic carbon foam contains interconnected pores.

11. The monolithic carbon foam of claim 4, wherein the monolithic carbon foam has a volumetric micropore surface area of 200 $m^2/cc$ to 500 $m^2/cc$, an electrical conductivity of 40 s/cm to 75 s/cm, and a Young's modulus of 1 GPa to 4 GPa.

12. The monolithic carbon foam of claim 2, further comprising a material selected from the group consisting of a non-OLC-based material, an oxide material, a metal, and a semiconductor material.

13. The monolithic carbon foam of claim 12, wherein the material is in the form of a fiber, a tube, a hollow sphere, a wire, a sheet, or a powder.

14. The monolithic carbon foam of claim 12, wherein the material is a non-OLC-based material containing activated carbon, molybdenum oxide, silicon, or molybdenum disulfide in the form of a sheet.

15. The monolithic carbon foam of claim 2, wherein the monolithic carbon foam has a density of 0.4 g/cc to 1.2 g/cc.

16. The monolithic carbon foam of claim 2, wherein the fused OLC nanoparticles each have a diameter of 2 nm to 50 nm.

17. The monolithic carbon foam of claim 2, wherein the monolithic carbon foam has a Vickers hardness of 18 MPa to 935 MPa.

18. An electrode of a supercapacitor, the electrode comprising an active material made of the monolithic carbon foam of claim 1.

19. An energy storage device comprising:
   a negative electrode containing an active material made of the monolithic carbon foam of claim 1,
   a positive electrode containing an active material also made of the monolithic carbon foam of claim 1,
   a separator disposed between the negative and positive electrodes to prevent a short circuit by direct contact thereof, and
   an electrolyte ionically connecting the electrodes,
wherein the inner surface of each electrode contacts with the electrolyte and the outer surface of each electrode is covered by a current collector.

20. The monolithic carbon foam of claim 10, wherein the interconnected pores include micropores having a diameter of 0.723 nm to 2 nm, mesopores having a diameter of 2 nm to 50 nm, and macropores having a diameter of greater than 50 nm.

* * * * *